May 1, 1956 B. W. KEESE 2,743,615
VEHICLE DRIVE AND POWER TAKE-OFF MECHANISM
Filed Sept. 29, 1950 3 Sheets-Sheet 3
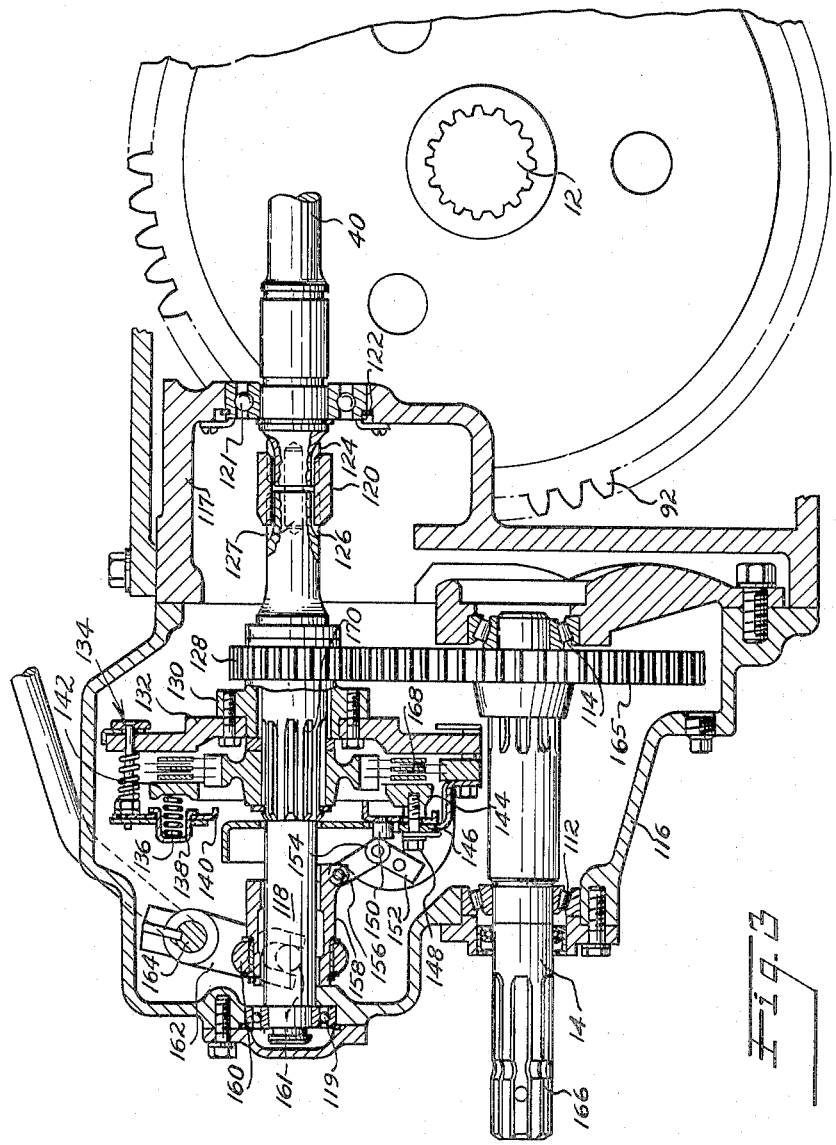
INVENTOR
BEVERLY W. KEESE
BY *Strauch, Nolan & Diggins*
ATTORNEYS

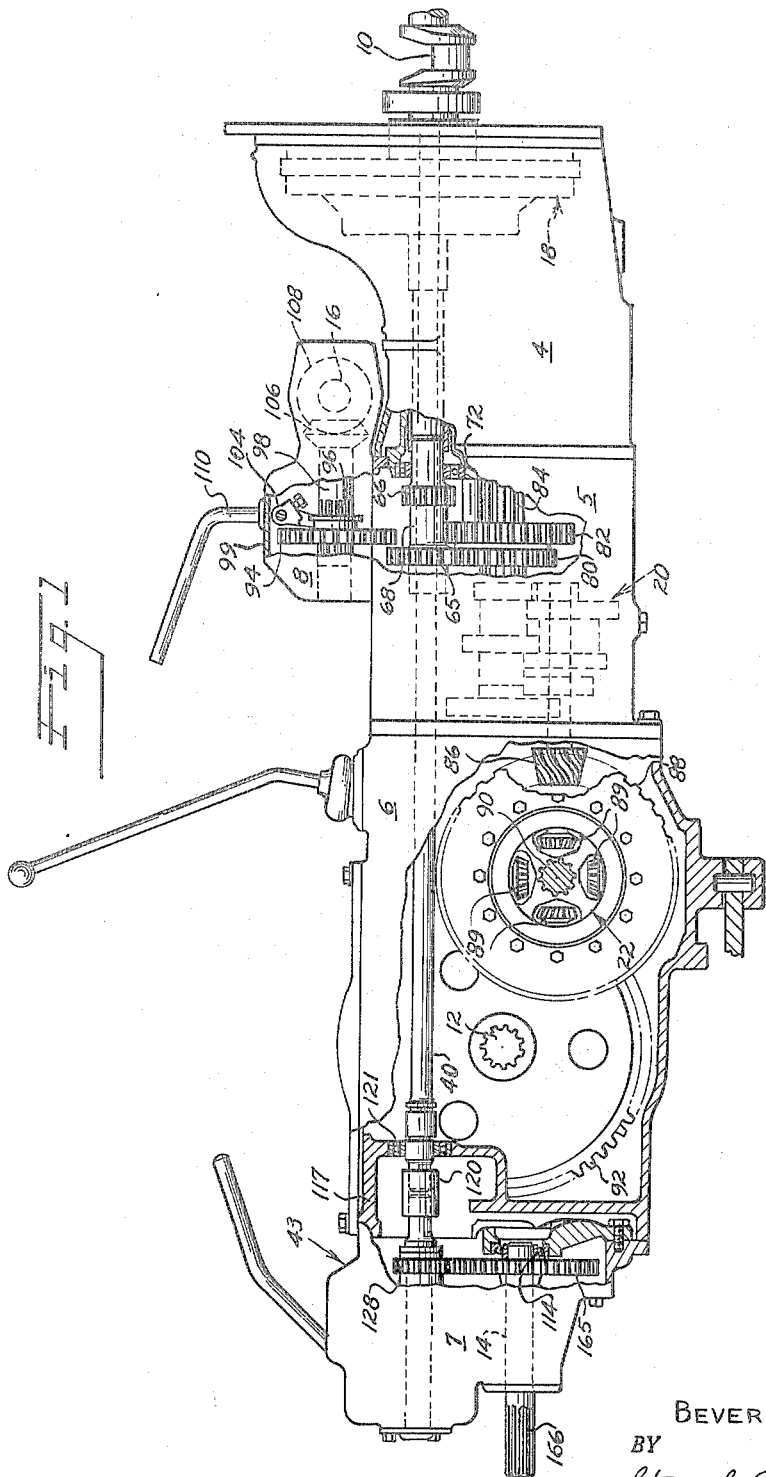

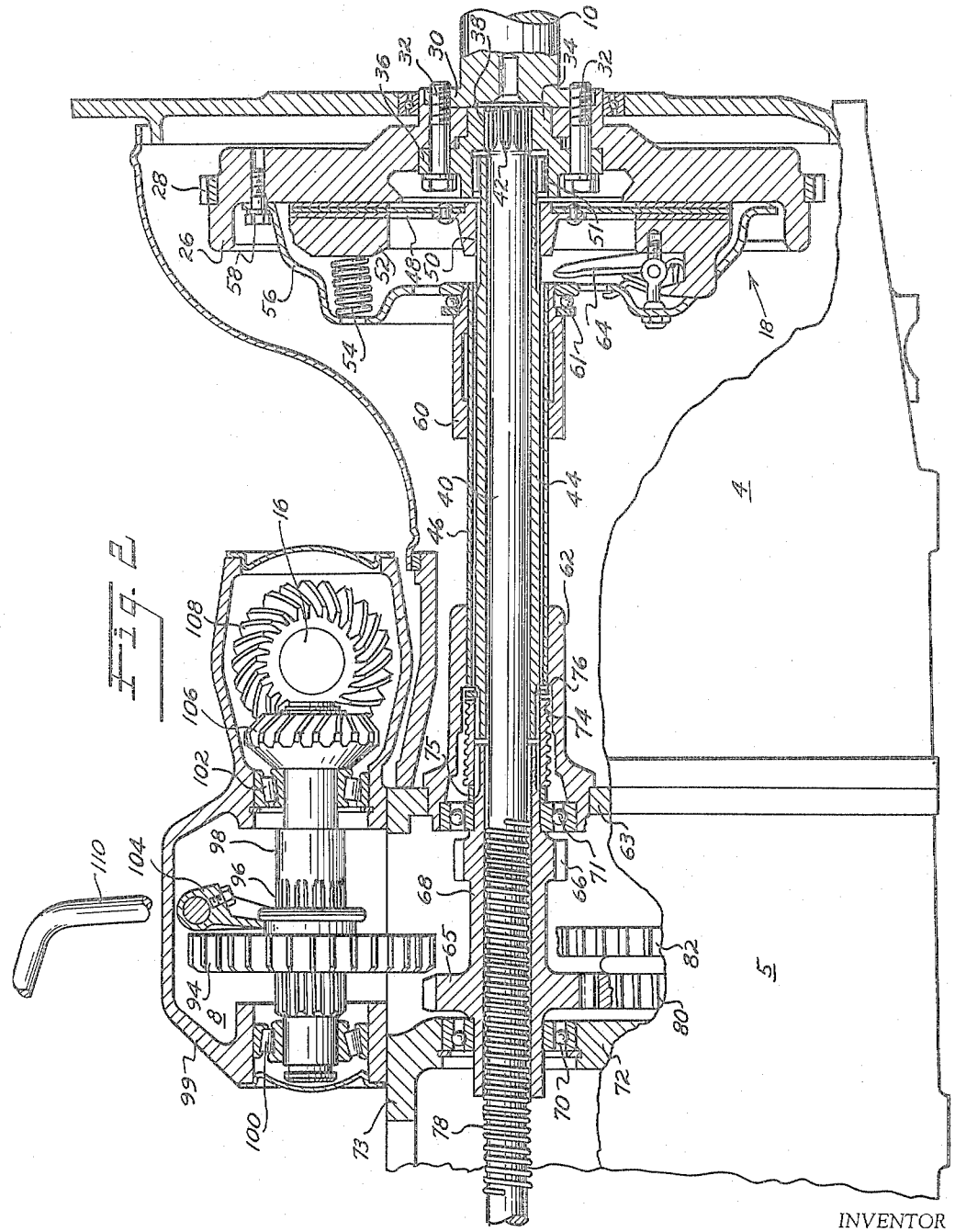

2,743,615

VEHICLE DRIVE AND POWER TAKE-OFF MECHANISM

Beverly W. Keese, Oshkosh, Wis., assignor, by mesne assignments, to Rockwell Spring and Axle Company, Coraopolis, Pa., a corporation of Pennsylvania Application September 29, 1950, Serial No. 187,575

5 Claims. (Cl. 74—15.63)

This invention relates to vehicle drive mechanisms and particularly to power take-off arrangements on tractors and similar engine driven vehicles.

More particularly the present invention comprises improvements in the general arrangement of vehicle drive and power take-off assemblies such as those disclosed in U. S. Patent No. 2,168,033, issued August 1, 1939, to Johnston et al, and in my co-pending application Serial No. 613,046 for Motor Vehicle Drive Mechanism, now United States Letters Patent No. 2,556,194, issued June 12, 1951.

The present invention contemplates an improved arrangement of both the mechanisms and housings of such assemblies whereby both the rear end live power take-off shaft drive unit and the lateral power take-off shaft drive unit are disengageable from the vehicle drive mechanism and demountable from the vehicle drive mechanism housing as unitary sub-assemblies to facilitate servicing of these units. The present invention has an additional advantage in that the vehicle drive mechanism is a standard assembly which may be operated without the power take-off sub-assemblies, or to which may be added either or both of the sub-assemblies depending upon the needs of the user of the vehicle.

It is accordingly a primary object of this invention to provide an improved vehicle drive and power take-off assembly in which the power take-off drive mechanisms are mounted in separate housings as unitary subassemblies which may be easily demounted from the vehicle drive housing and which are easily disengageable from the vehicle drive mechanisms.

Another object of this invention is to provide a vehicle drive mechanism and housing therefor, and a lateral power take-off shaft drive unit and housing therefor both of an improved construction whereby the lateral power take-off drive assembly is easily demountable from the vehicle drive assembly.

In prior art devices such as those mentioned, when a tractor is used to pull another vehicle, and at the same time drive a mechanism carried by said vehicle from the tractor power plant, such as a combine, the engine is sometimes stalled by initiating movement of the tractor and other vehicle and simultaneously initiating operation of the mechanism carried by said vehicle due to failure to disengage the power take-off clutch.

It is accordingly a salient object and purpose of the present invention to overcome this difficulty by providing an improved power take-off mechanism for a motor-driven tractor or other vehicle equipped with a normally engaged power transmission clutch which may be operated to disconnect the vehicle driving mechanism from the power plant, together with a normally inoperative means which may be operated to connect a power take-off shaft directly to the power plant independently of the engaged or disengaged position of the vehicle power transmission clutch. Thus, the engine may be started without load, and the operation of the mechanism carried by a vehicle drawn by the tractor initiated prior to the initiation of forward motion of the tractor and vehicle. Such mechanism may be operated concurrently with the movement of the tractor and vehicle, or while the tractor-driving mechanism is disconnected from the power source.

The present invention further contemplates the provision of a live power take-off drive unit having therein a clutch of novel and improved construction.

A further object of this invention is to provide an axially separable connection between the hollow vehicle drive shaft and the transmission power input gear located within the engine clutch compartment to facilitate servicing of the clutch without disturbing the transmission unit.

A further object of this invention is to provide a novel means for feeding lubricant from one compartment of a transmission unit housing to lubricate the gears within a second adjacent compartment.

Other objects of this invention will become apparent as the description proceeds in connection with the accompanying drawing wherein like reference numerals designate corresponding parts throughout the several views and wherein:

Figure 1 is a partially sectional side elevation view of the combined power take-off and vehicle drive assembly as a whole;

Figure 2 is an enlarged vertical sectional view taken through the center line of the power shafts; and Figure 3 is an enlarged vertical sectional view of the rear end live power take-off assembly taken along the center of the power take-off drive shaft.

General description

Referring now to the drawings, and to Figure 1 in particular, it will be seen that the present vehicle drive and power take-off assembly may be considered as comprising five basic units, an engine clutch compartments 4, a transmission unit compartment 5, a final rear wheel drive mechanism compartment 6, a live power take-off shaft drive unit 7, and a lateral power take-off shaft drive unit 8 which is mounted on top of the transmission unit compartment. These five units are connected together, their housings being secured one to another and their internal mechanisms being operatively connected, as will appear presently, to form a unitary vehicle drive and power take-off drive assembly. This assembly is designed to be mounted as the frame of a vehicle, such as a tractor, rearwardly of the engine or other prime mover. A portion of a power shaft of such a prime mover has been shown as crank shaft 10. Shaft 12 is a rear wheel axle of the vehicle. Power is transmitted from the crank shaft 10 of an internal combustion engine through suitable vehicle drive gearing, constituting a transmission unit in compartment 5 and final drive mechanism in compartment 6, to the axles 12 of the rear wheels of the vehicle. Power is also transmitted from the crank shaft 10 to rear end power take-off drive unit 7 and live power take-off shaft 14 thereof which is mounted below the axis of the crank shaft 10, and to a lateral power take-off drive unit 8 and lateral power take-off shaft 16 thereof, mounted above and perpendicular to the axis of the crank shaft 10. The rear end power take-off shaft 14 is releasably connected through suitable gearing to the crank shaft 10, so that it may be driven while the vehicle is not in motion. The rear axles 12 are connectable for drive from the crank shaft 10 through a clutch assembly 18, a variable speed reduction, gear type, transmission unit 20, and a differential mechanism 22, the lateral power take-off shaft 16 is connectable through suitable gearing to the shaft driven by the clutch assembly 18 so that the lateral power take-off shaft 16 is operable only while clutch 18 is engaged.

Drive mechanisms for drive shafts

Referring now to Figure 2, the flywheel 26, having a conventional ring gear 28 on its periphery, is secured to the flange portion 30 of the rear end of the crank shaft 10 by suitable means such as by machine bolts 32. Also secured to the flange 30 and flywheel 26 by machine bolts 32 is a short sleeve member 34, having a flange portion 36 and having the forward portion of its bore formed with an internal spline 38. The flywheel 26 is therefore held to crank shaft 10 between the flange portion 36 of the short sleeve member 34 and the flange portion 30 of the crank shaft 10 by the machine bolts 32. Axial alignment of these three members 10, 26, and 34 is attained by the arrangement whereby flange 30 of crankshaft 10 is seated within a hollow cylindrical recess in the adjacent face of the flywheel and whereby the sleeve member 34 extends through the bore of the flywheel 26. A live power take-off drive shaft 40 is mounted within the housing coaxially with the crank shaft 10 and flywheel 26. Shaft 40 has an external spline formed on its forward end at 42 which engages internal spline 38 on the short sleeve member 34, so that rotary motion is transmitted directly from the crank shaft 10 and flywheel 26 to the drive shaft 40 so long as the internal combustion engine is in operation. As is best seen in Figure 1, this shaft 40 is connected to the rear end power take-off shaft drive assembly 43 of the unit 7, which will be described in detail later.

Referring again to Figure 2, a hollow shaft 44, which is mounted coaxially with and surrounding the drive shaft 40 within a tubular housing 46, is driven from clutch disc 48 of the plate type clutch assembly 18, clutch disc 48 being splined to the hollow shaft 44 at 50. The forward end of hollow shaft 44 is journalled by an anti-friction bearing 51 within the bore of sleeve member 34 to the rear of internal spline 38. The structure of the clutch assembly 18 is conventional, the clutch disc 48 being mounted coaxially with and between the flywheel 26 and a clutch pressure plate 52, these three elements being held in annular surface engagement by compression springs 54, which are mounted in compressed condition between the housing 56 and the clutch pressure plate 52. The clutch housing 56 is secured to the flywheel 26 in any suitable manner such as by machine bolts 58. A clutch release sleeve 60, having a thrust type ball bearing 61 mounted coaxially on its forward end, is mounted for longitudinal movement along the tubular housing 46. Tubular housing 46 is a forward extension of a flanged cup member 62 which is secured to the forward wall 63 of the transmission housing. When clutch release sleeve 60 is shifted forward from the position shown, the forward surface of bearing 61 engages clutch release levers 64 to cause disengagement of the clutch in the usual way. Movement of the clutch release sleeve 60 is controlled in the conventional manner from a foot pedal (not shown). As shown in the drawing, the clutch is in its normal or engaged position so that hollow shaft 44 is connected to be driven by crank shaft 10 through the clutch assembly 18 and the flywheel 26.

A pair of gears 65 and 66 having a common elongated hub 68, are mounted coaxial with, and for rotation relative to the shaft 40, hub 68 being journalled by anti-friction bearings 70 and 71 in the transmission compartment dividing wall 72 of the housing 73 and cup member 62 respectively. Elongated hub 68 may be considered as a hollow shaft having gears 65 and 66 affixed thereto. The end of the hub 68, forward of the gear 66, extends through the ball bearing 71 and is connected to the hollow shaft 44 within cup member 62 by a coupling member 74. Coupling 74, which supports the rear end of hollow shaft 44 and maintains concentric alignment between hub 68 and shaft 44 is internally splined for engagement with external splines on the forward end of the hub 68 and the rear end of the hollow shaft 44. A spacer 75 and snap ring 76 have been provided to prevent axial movement of the coupling 74. A tightly coiled wire spring 78 is mounted around the drive shaft 40 extending within the bore of gear hub 68 to feed the oil which is thrown from the transmission gears on to shaft 40 through the bore of gear hub 68, into coupling 74, through the splines into cup 62. The oil then passes through bearing 71 into the forward part of the transmission unit compartment 5. The spiral of spring 78 is wound in the proper direction for forcing lubricant along the shaft 40 during its rotation.

*Transmission unit and final drive mechanism*

As may be seen in Figure 1, a pair of integral concentric gears 80 and 82 are mounted for rotation with, and for longitudinal movement along an externally splined shaft 84. These gears 80 and 82 may be shifted along the splined shaft 84 by any conventional gear shift linkage (not shown) to one of three positions: so that gear 65 is engaged by gear 80, so that gear 66 is engaged by gear 82, or to an intermediate neutral position where neither pair of gears is engaged. The splined shaft 84 is the input shaft to a conventional variable speed reduction transmission unit 20. (A suitable variable speed reduction transmission unit is that disclosed in copending application Serial No. 634,180 of B. W. Keese, for Propulsion and Power Take-Off Gearing for Vehicles, now United States Letters Patent No. 2,521,729, issued September 12, 1950.) A spiral bevel pinion 86 is fixed to the output shaft of the variable speed reduction transmission unit 20. The spiral bevel pinion 86 meshes with spiral bevel gear 88 connected to the input of differential gear assembly 22. The drive from spiral bevel pinion 86 through the differential gearing 22 to the rear wheel axles 12 is substantially the same drive as that disclosed in copending application Serial No. 767,230, of B. W. Keese et al., for Power Take-Off Mechanism, now United States Letters Patent No. 2,674,892, issued April 13, 1954. The bevel gears (not shown), which are driven by the differential pinions 89, are mounted for rotation on the shaft 90 and have spur gears (not shown) formed integral with the outer extensions of their hubs. These spur gears mesh with bull gears 92 which are splined to the rear wheel axles 12. The rear wheels are thus driven from the crank shaft 10, through engaged clutch 18, hollow shaft 44, gears 65 and 80 or 66 and 82, the transmission unit 20, bevel pinion 86, bevel gear 88, differential gearing 22, to bull gears 92 and axles 12 on which they are fixed.

*Lateral power take-off shaft drive*

As is better shown in Figure 2, a spur gear 94 is mounted on the splined portion 96 of a shaft 98, which is journalled in a lateral power take-off drive housing 99, by roller thrust bearings 100 and 102. Lateral power take-off housing 99 is demountably secured to the top of housing 73. Shaft 98 as thus mounted is above and parallel to shaft 40. Gear 94 may be moved by means of a shifting fork 104 rearwardly along the spline 96 from a disengaged position, as shown, into engagement with spur gear 65, which is driven from the output of the clutch assembly 18 as previously described. Lateral power take-off shaft 16 is journalled within housing 99 coplanar with and perpendicular to shaft 98. A spiral bevel pinion 106 is fixed to the shaft 98 forward of the roller thrust bearing 102 in engagement with a spiral bevel gear 108, fixed to the lateral power take-off shaft 16. A hand operated lever 110 is provided for controlling the position of the shifting fork 104, and thus the engagement of gears 94 with gear 65. The lateral power take-off shaft 16 may be operatively connected, at the option of the operator, to the transmission unit power input means, that is gear 65 for drive from the output of the clutch assembly 18. Power is transmitted to this lateral power take-off shaft 16 from the power shaft 10 of the prime mover only if gear 94 has been shifted to engage gear 65 and if the clutch assembly 18 is engaged.

*Drive train for rear end live power take-off shaft*

Referring to Figure 3, it is seen that the rear end live power take-off shaft 14 is mounted for rotation by suitable bearng means, such as thrust type roller bearings 112 and 114, in the live power take-off shaft housing 116. This housing 116 is fixed to the final rear wheel drive mechanism housings 117 by any suitable fastening means such as machine bolts (not shown). The axis of the live power take-off shaft 14 is parallel to and below the axis of drive shaft 40. A live power take-off drive shaft second section 118 is mounted for rotation within the housing 116 coaxial with the drive shaft 40, being journalled in bearing 119 and coupled to shaft 40 by a coupling member 120. The rear end of shaft 40 is journalled in the rear wall of housing 117 by an anti-friction bearing 121, axial movement of which is prevented by snap ring 122. Coupling 120 is internally splined for engagement with the external splines 124 and 126 on the rear end of the drive shaft 40 and the forward end of the live power take-off drive shaft second section 118 respectively. Coupling 120 supports the forward end of shaft 118 and in cooperation with pin 127 maintains coaxial alignment between shafts 40 and 118.

A gear 128, which is mounted for rotation on shaft 118, has an integral flange 130 to which the housing 132 of a friction clutch assembly 134 is fixed. The clutch assembly structure is quite similar to that disclosed in copending application Serial No. 790,834 for Clutch Brake of C. A. Cook, now United States Letters Patent No. 2,590,089, issued March 25, 1952. Springs 136 of the clutch assembly are mounted in housings 138 on disk 140, having pressure contact with pressure plate 142. This plate 142 is formed with a boss 144 on which disk 140 is supported for movement toward and from the plate 142. Movement of disk 140 in one direction under the pressure of springs 136 is limited by the stop 146 which is secured to the end of boss 144 as by bolt 148 and movable in an elongated opening provided in the wall of housing 132. A stud 150, fixed to the disk 140 adjacent stop 146, projects outwardly through said opening in the housing wall. A link 152 is pivotally mounted intermediate its ends on the housing 132 and is provided at one end thereof with a roller 154 bearing against the stud 150. This end of link 152 is connected with one end of link 156, the other end of which is pivotally connected to a slidable sleeve 158 on the shaft 118. This sleeve at one of its ends has an external groove loosely receiving collar 160 which is provided at diametrically opposite points with trunnions 161. A clutch fork 162 is fixed to one end of an actuating member or shaft 164 journalled in a bearing box (not shown) provided on the wall of the rear section of housing 116. The arms of this fork at their ends are operatively connected with the respective trunnions 161 on the collar 160.

To the output shaft 14 of the power take-off unit, large gear 165 is splined or otherwise fixed and is in constant mesh with the clutch gear 128. This shaft 14 extends through the rear wall of housing 116, the rearwardly extending end of shaft being splined as indicated at 166 or provided with other suitable means for coupling connection with the mechanism to be driven thereby.

In the operation of the above described mechanism, assuming that a combine or other vehicle is connected to the rear end of the tractor and mechanism carried by said vehicle is operatively coupled to the power take-off shaft 14; before starting the engine, the operator first moves the collar 60 forwardly. Thrust bearing 61 is thus moved forwardly to actuate the clutch fingers 64 and move pressure plate 52 rearwardly against the resistance of springs 54 to relieve the pressure of clutch disk 48 against the face of the flywheel 26. Thus when the engine is started, no power will be transmitted through the transmission drive shaft 44 to the tractor driving mechanism. However, since shaft 40 is splined to sleeve 34, which is bolted to the engine crankshaft 10, this shaft will be rotated to transmit power to shaft 118, and with clutch assembly 134 in engaged position, gear 128 is rotated as a unit with shaft 118 to drive gear 165 and power take-off shaft 14.

After disengaging clutch 18 or shifting the change speed transmission to neutral to render the tractor driving mechanism inoperative, with clutch 134 in disengaged position, the engine is started to drive shafts 40 and 118 as above explained.

Power is transmitted through the reduction gearing from shaft 118 to shaft 14 by operating member 164 to shift sleeve 158 to the right from the position shown in Figure 3. Roller 154 is thus moved by toggle links 152 and 156 to urge plate 140 inwardly and compress springs 136 which in turn compress the disk assembly 168 splined at 170 to shaft 118. A driving connection between said disk assembly fixed to clutch shaft 118 and casing 132 on gear 128 is thereby established. The gear and shaft are thus caused to rotate as a unit to drive gear 165 and shaft 14. The combined or other mechanism may thus be operated at the proper speed while the tractor is stationary and before it advances into the grain or other crop. Clutch 18 is then engaged to drive shaft 44 and gears 65 and 66 and the tractor driving mechanism at the selected ground speed. There is a continued uninterrupted transmission of power to shaft 14 and the combine or other auxiliary mechanism through shaft 40 which rotates as a unit with tubular shaft 44 and gears 65 and 66 by reason of its connection, as above described, with the engine crankshaft.

Operation of shaft 14 and the auxiliary mechanism coupled therewith may be discontinued at any time independently of clutch unit 18 by shifting sleeve 158 to the rear so that the parts of clutch 128 will resume the positions shown in Figure 3 and break the driving connection between shaft 118 and gear 128.

The live power take-off shaft drive mechanism 43 may be removed from the vehicle drive mechanism by unbolting the live power take-off housing 116 from the housing 117 of the transmission and final drive mechanism and disengaging spline 126 on the forward end of the live power take-off drive shaft from the internal spline in the coupling 120. The rear end live power take-off drive mechanism 43 may be thus demounted as a unit from the remainder of the drive mechanism. A suitable plate may be secured to close the rearwardly facing pocket in the rear wall at the rear end of the final drive mechanism housing 117 as a dirt cover.

What has thus been disclosed and described is a power take-off and vehicle drive assembly having a rear wheel drive train comprising transmission unit and final drive mechanism releasably connectable to the crank shaft of an internal combustion engine, a rear end live power take-off mechanism having the live power take-off shaft positioned below the axis of the engine crank shaft and being connectable through a normally disengaged clutch mechanism directly to the crank shaft of the engine, and a second laterally extending power take-off shaft operable from the power input means to the transmission unit of the rear wheel drive mechanism. Both power take-off shaft drive assemblies are demountable as units from the vehicle drive mechanism. The rear end power take-off shaft is operable independently of the transmission power input means while the lateral power take-off shaft is not.

It will be seen that the present invention provides a power take-off reduction gear unit and clutch assembly together with shaft 40 as an accessory which may be readily mounted in operative position by the owner of the tractor or vehicle and coupled to the crank shaft. When the power take-off unit is not installed, the opening at the rear end of housing structure 73 may be closed by means of a suitable cover plate. Similarly the lateral power take-off unit pulley assembly 8 may be supplied as an accessory unit which may be readily mounted in operative position as required and drivingly connected with gear 65 on hub or shaft 68 forming an extension of transmission drive shaft 44.

While the present embodiment of this invention has been described in considerable detail, the invention may be embodied in other forms without departing from the spirit or essential characteristics thereof. This embodiment is therefore to be considered in all respects illustrative and not restrictive, the scope of the invention being indicated by the appended claims and all changes which come within the meaning and range of equivalency of the claims are therefore intended to be embraced therein.

What is claimed and desired to be secured by United States Letters Patent is:

1. In a vehicle drive mechanism, a variable speed transmission unit and housing therefor, said housing having first and second compartments separated by an interior dividing wall, a lubricant receiving cup fixed in an exterior wall of said housing which is longitudinally spaced from said dividing wall, a clutch connected hollow transmission driving shaft extending through said first compartment, means journalling said hollow shaft in said cup and said dividing wall, a constantly driven power take-off drive shaft extending through said hollow shaft and said second compartment and connected at one end to an engine power shaft, and means for feeding lubricant from said second compartment through said hollow shaft into said lubricant receiving cup which delivers it into said first compartment.

2. The combination defined in claim 1, wherein said lubricant feeding means comprises a coil spring surrounding said power take-off drive shaft extending from within said hollow shaft into said second compartment whereby oil splashed on the power take-off drive shaft by the part of the transmission unit in said second compartment is fed along said power take-off drive shaft to said first compartment.

3. In a vehicle having an engine, a normally engaged clutch assembly, a variable speed transmission assembly, a differential and wheel axle drive assembly and a rear power take-off assembly all of said assemblies being arranged in longitudinal succession within individual rigidly connected housings, said rear power take-off assembly including a normally disengaged clutch, a long live power take-off shaft constantly driven by said engine extending through the clutch, transmission and differential and wheel axle drive assembly housings and detachably connected to said rear power take-off assembly, a hollow shaft concentric with said live power take-off shaft connected through said clutch assembly to said engine, said hollow shaft comprising a first section within the clutch housing, a second section disposed within said transmission assembly housing and a coupling disposed within the clutch assembly housing between said sections securing them together rigidly during all drive conditions but being disconnectable for disassembly of the clutch and transmission assemblies, and transmission drive gearing upon said second hollow shaft section.

4. In a vehicle drive, a rigid housing assembly comprising in succession from front to rear a clutch housing section, a variable gear transmission housing section, and a final rear wheel drive gear housing section, an engine driven power shaft forwardly of said housing assembly, clutch and variable speed transmission means in the respective housing sections connecting said power shaft to final rear wheel drive gearing, a power take-off drive shaft extending through the housing assembly connected to rotate with said power shaft at its front end and journalled at its rear end to project through the rear wall of the housing assembly, a live power take-off housing section removably secured upon said rear wall, a first power take-off shaft section journalled at its rear end in said live power take-off housing section and having its front end aligned with and releasably coupled to the rear end of said drive shaft, a second live power take-off shaft section journalled in said live power take-off housing section and projecting externally thereof, and an associated clutch and reduction gearing interconnecting said shafts within said live power take-off housing section, whereby said live power take-off housing section including said shaft sections, reduction gearing and associated clutch may be removed as a unit from said housing assembly.

5. In a vehicle, a housing structure containing variable speed transmission gearing and wheel drive mechanism in series and having spaced end walls, an engine driven shaft extending into said housing structure through one end wall, a releasable clutch connecting said shaft to said transmission, a live power take-off drive shaft positively drive connected to the engine driven shaft within said housing structure and extending through said housing structure and said other end wall, means providing an outwardly open pocket in said other end wall and wherein said live power take-off drive shaft terminates, bearing means supporting said live power take-off drive shaft in said other end wall, and means on said other end wall for optionally attaching thereto a cover plate or a power take-off gearing housing containing a shaft adapted to project into said pocket and be coupled to said live power take-off drive shaft.

References Cited in the file of this patent

UNITED STATES PATENTS

| | | |
|---|---|---|
| 2,052,650 | Pearmain | Sept. 1, 1936 |
| 2,053,542 | Vandervoort | Sept. 8, 1936 |
| 2,140,687 | Brown | Dec. 20, 1938 |
| 2,168,033 | Johnston et al. | Aug. 1, 1939 |
| 2,276,000 | Stumpf | Mar. 10, 1942 |
| 2,311,010 | Vickers | Feb. 16, 1943 |
| 2,352,270 | Land et al. | June 27, 1944 |
| 2,448,822 | Pinardi et al. | Sept. 7, 1948 |
| 2,521,729 | Keese | Sept. 12, 1950 |

OTHER REFERENCES

Product Engineering, page 80, April 1949.